US006409144B1

(12) United States Patent
Inami

(10) Patent No.: US 6,409,144 B1
(45) Date of Patent: Jun. 25, 2002

(54) SOLENOID VALVE WITH INTEGRATED YOKE AND BOBBIN

(75) Inventor: Madoka Inami, Kariya (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 0 days.

(21) Appl. No.: 09/712,154

(22) Filed: Nov. 15, 2000

(30) Foreign Application Priority Data

Nov. 15, 1999 (JP) .......................................... 11-324707

(51) Int. Cl.[7] ................................................ F16K 31/02

(52) U.S. Cl. ................... 251/129.15; 335/255; 335/279

(58) Field of Search ....................... 251/129.15, 129.01; 335/255, 260, 278, 281, 279

(56) References Cited

U.S. PATENT DOCUMENTS 4,087,773 A * 5/1978 Jencks et al. ............... 335/243
5,361,883 A * 11/1994 Yamamoto ................ 192/84 C
6,163,239 A * 12/2000 Ozawa et al. ....... 251/129.01 X

FOREIGN PATENT DOCUMENTS

JP 10-299932 11/1998

* cited by examiner

*Primary Examiner*—Kevin Lee
(74) *Attorney, Agent, or Firm*—Burns, Doane, Swecker & Mathis, LLP

(57) ABSTRACT

An electromagnet includes a cylindrically shaped electric coil made of magnetic material and wound around a bobbin made of resin material and made of magnetic material, a cylindrically shaped case made of magnetic material and housing the electric coil, a yoke made of magnetic material for forming a magnetic circuit in cooperation with the case, with both longitudinal ends of the yoke facing the bobbin, and a plunger made of magnetic material and disposed in the inner peripheral of the yoke for moving by electromagnetic force in the longitudinal direction when current is supplied to the electric coil. The bobbin and the yoke are integrated with each other by resin forming, with the outer peripheral portion of the yoke facing the inner peripheral portion of the bobbin being subjected to grooved treatment in the longitudinal direction to form at least one groove and/or knurling treatment to form a knurled outer peripheral portion of the yoke. The electromagnet includes a spool valve positioned at one end of the case.

9 Claims, 2 Drawing Sheets

SOLENOID VALVE WITH INTEGRATED YOKE AND BOBBIN

Figure 1:
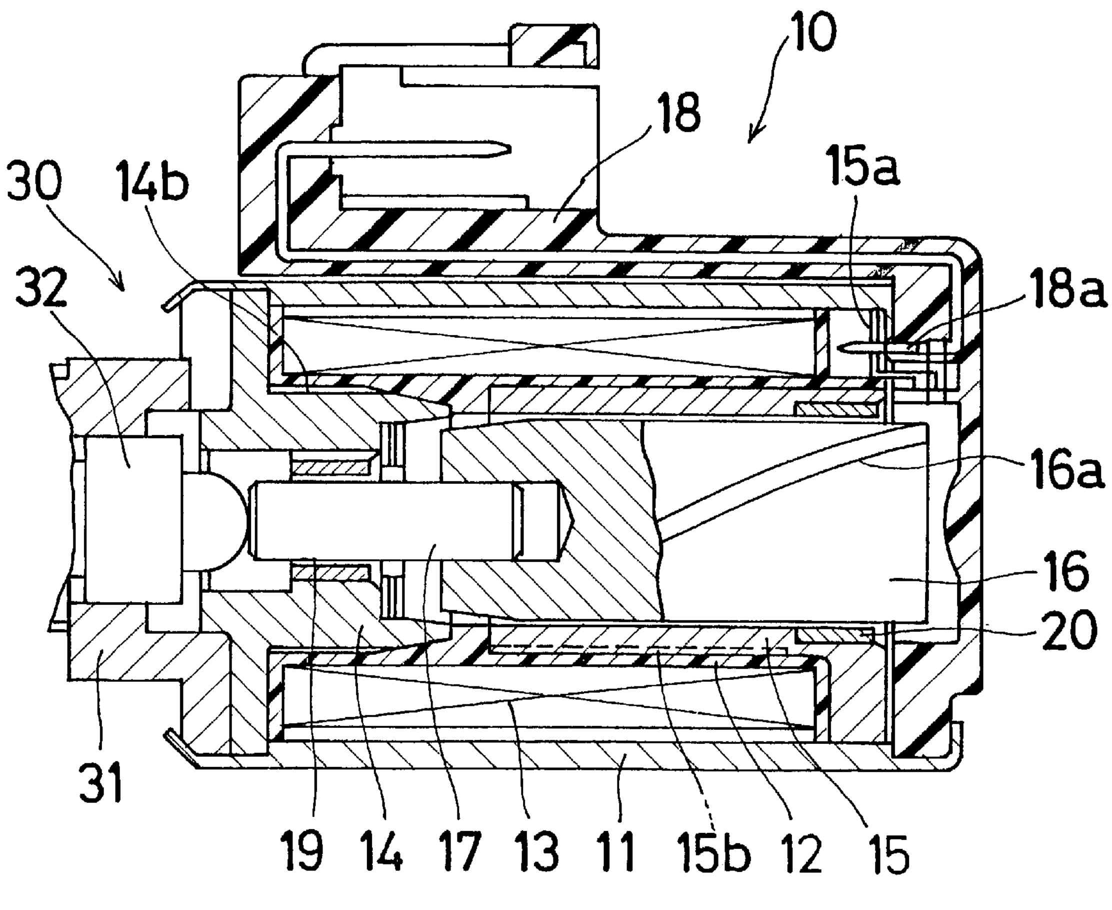

This application is based on and claims priority under 35 U.S.C. §119 with respect to Japanese Application No. 11(1999)-324707 filed on Nov. 15, 1999, the entire content of which is incorporated herein by reference.

FIELD OF THE INVENTION

This invention generally relates to electromagnets. More particularly, the present invention pertains to an electromagnet used for a solenoid valve for controlling a hydraulic pressure circuit.

BACKGROUND OF THE INVENTION

Electromagnet have been used in the past for solenoid valves. One such type of solenoid valve is disclosed in Japanese Patent Laid-Open No. Hei 10-299932. This solenoid valve includes a cylindrically shaped bobbin wound on its outer periphery with an electric coil, a yoke disposed at an axial end in a longitudinal direction of the electric coil and an inner peripheral portion of the bobbin and forming a magnetic circuit in cooperation with a case made of magnetic material, and a plunger disposed in the inner peripheral portion of the yoke and slidably movable in the yoke.

The bobbin is formed by inserting fixed cores and the plunger is held on the inner peripheral faces of the bobbin. The yoke made of magnetic material is disposed at both ends in the longitudinal direction of the cylindrical coil wound around the bobbin made of resin and is disposed in an inner peripheral portion of the bobbin. A space between the inner peripheral portion of the bobbin and the yoke does not exist as the yoke and the bobbin are made as one unit by insert forming.

However, in the above-described solenoid valve, the outer periphery of the yoke facing the inner peripheral portion of the bobbin is smooth, and the thickness of the cylindrical portion of the bobbin is relatively thick in order to ensure the necessary strength for the solenoid valve. Therefore, the magnetic efficiency of the solenoid valve is not capable of being improved beyond a certain level. Also, it is possible that the bobbin may become broken away from the yoke by virtue of the heat and/or vibration that may exist in the surrounding environment in which the electromagnet is used (e.g., in a solenoid valve in a vehicle).

A need thus exists for an improved electromagnet and solenoid valve which overcome the above drawbacks.

A need also exists for a solenoid valve having improved magnetic efficiency and capable of inhibiting or preventing the bobbin from becoming broken away from the yoke by heat impact.

SUMMARY OF THE INVENTION

In accordance with an aspect of this invention, an electromagnet includes a cylindrically shaped electric coil wound around a bobbin made of resin material, a cylindrically shaped case made of magnetic material and housing the electric coil, a yoke made of magnetic material for forming a magnetic circuit in cooperation with the case, with both longitudinal ends of the yoke facing the bobbin, and a plunger made of magnetic material and disposed in the inner peripheral of the yoke for moving by electromagnetic force in the longitudinal direction when current is supplied to the electric coil. The bobbin and the yoke are integrated with each other by insert forming, with the outer peripheral portion of the yoke facing the inner peripheral portion of the bobbin being subjected to grooved treatment in the longitudinal direction to form at least one groove and/or knurling treatment to form a knurled outer peripheral portion of the yoke.

BRIEF DESCRIPTION OF THE DRAWING FIGURES

Figure 2:
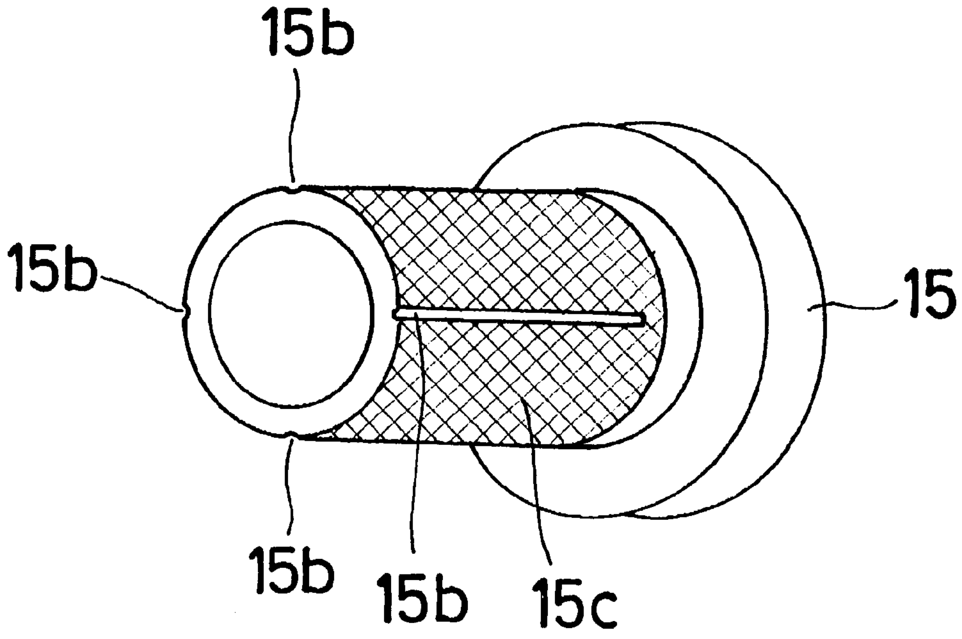

The foregoing and additional features and characteristics of the present invention will become more apparent from the following detailed description considered with reference to the accompanying drawing figures in which like reference numerals designate like elements and wherein:

FIG. 1 is a cross-sectional view of an electromagnet used in a solenoid valve according to an embodiment of the present invention; and FIG. 2 is an enlarged perspective view of the rear yoke shown in FIG. 1.

DETAILED DESCRIPTION OF THE INVENTION

Referring to FIG. 1, the electromagnet 10 used in a solenoid valve according to an embodiment of the present invention is a linear type electromagnet. The electromagnet 10 gives a thrust force in proportion to the value of the supply current for a spool 32 of a spool valve 30 connected to an end (i.e., the right end) of a valve housing 31 located on the left side of the electromagnet shown in FIG. 1.

The electromagnet 10 includes a cylindrical metal case 11 made of a magnetic material, a bobbin 12 made of non-magnetic material such as resin, an electric coil 13 wound around the bobbin 12, and a front yoke 14 made of magnetic material such as metal. The front yoke 14 extends from the left side of the bobbin 12 to the inner peripheral portion of the bobbin 12 at the left portion of the bobbin 12. The electromagnet 10 also includes a rear yoke 15 made of magnetic material such as metal that extends from the right side of the bobbin 12 to the inner peripheral portion of the bobbin 12 at the right portion of the bobbin 12, a plunger 16 disposed in the inner peripheral portion of the rear yoke 15 and made of a magnetic material, a shaft 17 made of metal non-magnetic material and fixed to the plunger 16 as a unit, and a connector 18 made of an insulating material such as resin. The integrated body formed by the plunger 16 and the shaft 17 is slidably supported by two bushes 19, 20 fixed in the inner peripheral portion of the yokes 14, 15. The two bushes 19, 20 are made of magnetic material. A groove 16*a* connecting to or extending between both ends of the plunger 16 is formed on the outer peripheral portion of the plunger 16.

The bobbin 12 and the front and rear yokes 14, 15 are integrated together by insert forming. Generally speaking, this involves positioning the front and rear yokes 14, 15, which together constitute a yoke, in the bobbin 12 in the illustrated manner and then injecting resin through use of suitable equipment between the outer surface of the yoke (i.e, the outer surfaces of the front and rear yokes 14, 15) and the inner peripheral surface of the bobbin 12. A pair of terminals 15*a* connected electrically to both ends of the wire which forms the electric coil 13 is provided on the right end portion of the rear yoke 15 (FIG. 1 illustrates one of the pair of terminals 15*a*). An electrical insulation between the rear yoke 15 and each terminal 15*a* is achieved by an insulated membrane made of resin material formed during the insert molding. In addition, the connector 18 is inserted into an opening portion at the right end of the case 11 as shown in FIG. 1. The connector 18 is fixed to the case 11 by caulking treatment at a caulking portion of one end of the case 11.

A pair of terminals 18*a* each electrically connected with respective ones of the pair of terminals 15*a* of the rear yoke 15 is formed by insert forming in the connector 18 made of resin. FIG. 1 illustrates one of the terminals 18*a* forming the pair of terminals. An electrical connecting relationship is established between the terminal 15*a* and the terminal 18*a* by inserting the terminal 18*a* into a slit of the terminal 15*a*.

The cylindrical outer surface portion of the rear yoke 15 facing the inner peripheral portion of the bobbin 12 is provided with four longitudinally extending grooves 15*b* formed by an appropriate groove formation technique as shown in FIG. 2. The cylindrical outer surface portion of the yoke 15 is also subjected to knurling treatment to form a knurled portion 15*c* as shown in FIG. 2.

In this embodiment of the present invention, the number of grooves 15*b* extending in the longitudinal direction and formed in the outer surface of the rear yoke 15 is four, but a different number of grooves can be provided. In addition to providing advantages as discussed in more detail below, the grooves 15*b* provide flow paths of sorts for the resin during insert molding to facilitate the flow of the resin.

Similarly, as shown in FIG. 1, the cylindrical outer surface portion of the front yoke 14 facing the inner peripheral portion of the bobbin 12 is provided with four grooves 14*b* extending in the longitudinal direction and formed by an appropriate groove formation technique. The front yoke 14 can also be provided with a knurled outer surface similar to the knurled outer surface on the rear yoke 15 shown in FIG. 2. The number of grooves on the outer surface of the front yoke can vary as mentioned above in connection with the grooves provided on the outer surface of the rear yoke. The grooves on the front yoke 14 can also facilitate resin flow as also described above.

The longitudinally extending grooves of the yokes 14, 15 each form a longitudinally extending convex portion, projection or rib along the cylindrical inner peripheral portion of the bobbin 12 when the bobbin 12 and the yokes 14, 15 are integrated together by insert forming. These convex portions, projections or ribs engage the respective groove in the yokes 14, 15 and form reinforcing ribs for the bobbin 12. Therefore, the thickness of the bobbin 12 can be reduced by virtue of these reinforcing ribs.

Further, by way of the knurling treatment forming the knurled surfaces on the outer surfaces of the front and rear yokes 14, 15 the inner peripheral portion of the bobbin 12 and the facing outer peripheral portion of the front and rear yokes 14, 15 are better connected in both the longitudinal and the peripheral directions after the insert molding. The knurling defines convex-like and concave-like regions on the outer peripheral portion of the front and rear yokes 14, 15 (regions that are raised and depressed relative to one another) and the resin during insert molding is able to flow throughout these knurled surface of each of the yokes 14, 15 to provide an improved connection between the bobbin 12 and the front and rear yokes 14, 15. Thus, the bobbin 12 is not as susceptible to being broken away from the yokes 14, 15 by heat and/or vibration that may exist in the surrounding environment in which the electromagnet is used (e.g., in a solenoid valve in a vehicle).

FIG. 1 illustrates the condition of the electromagnet when a predetermined current is supplied to the electric coil 13 of the electromagnet 10. If the predetermined current flows in the electric coil 13 of the electromagnet 10, a magnetic flux occurs, and the magnetic flux flows from the rear yoke 15 to the front yoke 14 via the plunger 16. The plunger 16 is thus pulled to the left in FIG. 1 by an electromagnetic force, and so the spool 32 is pushed to the left as the shaft 17 receives the thrust force in the leftward direction which is proportional to the current flowing to the electric coil 13.

According to the present invention, the electromagnet 10 is provided with a cylindrically shaped electric coil 13 wound around the bobbin 12 made of resin so that the bobbin 12 is disposed at the inner peripheral portion of the electric coil 13. The yoke, defined by the front and rear yokes 14, 15, made of magnetic material and forming the magnetic circuit cooperating with the case made of magnetic material, is integrated with the bobbin 12 by insert molding to form an integral structure formed in one-piece. Longitudinally extending convex projections or ribs are formed during the insert forming on the inner peripheral portion of the cylindrical portion of the bobbin 12 by virtue of the grooves 15*b* provided on the outer peripheral portion of the yoke. These convex projections or ribs form reinforcing-like ribs. It is thus possible to reduce the thickness of the thinned portion of the yoke and thus realize improved magnetic efficiency.

Further, during insert forming, the resin flows into the knurled region on the outer surface of the front and rear yokes to provide an improved and more secure connection between the yoke and the bobbin 12. The bobbin 12 is thus not as likely to become broken away from the front and rear yokes 14, 15 by heat or vibration that may exist in the environment in which the electromagnet is used.

It is to be understood that although the version of the present invention described above involves forming one or more grooves in the yoke 14, 15, the groove or grooves can also be formed on the inner peripheral surface of the bobbin 12.

The principles, preferred embodiments and modes of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. An electromagnet comprising;

a cylindrically shaped electric coil wound around a bobbin made of resin material;

a cylindrical shaped case made of magnetic material for involving the electric coil;

a yoke made of magnetic material to form a magnetic circuit in cooperation with the case, portions of the yoke facing both longitudinal ends of the bobbin;

a plunger made of magnetic material and disposed in an inner periphery of the yoke, the plunger being moved in the longitudinal direction by electromagnetic force upon current being supplied to the electric coil; and the bobbin and the yoke being integrated with each other by insert forming, with at least one of an outer peripheral portion of the yoke and a facing inner peripheral portion of the bobbin being provided with at least one of a grooved treatment extending longitudinally and knurling treatment.

2. The electromagnet according to claim 1, wherein the yoke includes a front yoke and a rear yoke.

3. The electromagnet according to claim 1, including a non-magnetic shaft integrated with the plunger to move with the plunger.

4. The electromagnet according to claim 3, including a spool valve positioned at one end of the case, the spool valve including a spool engageable with the shaft upon movement of the shaft.

5. A solenoid valve comprising:

an electric coil wound around a bobbin, a case made of magnetic material and involving the electric coil, a yoke made of magnetic material for forming a magnetic circuit in cooperation with the case and facing both longitudinal ends of the bobbin;

a plunger made of magnetic material disposed in an inner peripheral portion of the yoke, the plunger being longitudinally moved by electromagnetic force when current is supplied to the electric coil, the bobbin and the yoke being integrated with each other by insert forming, at least one of an outer peripheral portion of the yoke and a facing inner peripheral portion of the bobbin being provided with at least one of a grooved treatment extending in the longitudinal direction and knurling treatment.

6. The solenoid valve according to claim 5, wherein the outer peripheral portion of the yoke is provided with grooved treatment to form at least one longitudinally extending groove on the outer peripheral portion of the yoke.

7. The solenoid valve according to claim 5, wherein the yoke includes a front yoke and a rear yoke.

8. The solenoid valve according to claim 5, including a non-magnetic shaft integrated with the plunger to move with the plunger.

9. The solenoid valve according to claim 8, including a spool valve positioned at one end of the case, the spool valve including a spool engageable with the shaft upon movement of the shaft.

* * * * *